(12) United States Patent
Whitby et al.

(10) Patent No.: US 11,912,021 B2
(45) Date of Patent: Feb. 27, 2024

(54) PRINTER CASSETTE WITH MOVABLE TENSIONING ROLLER AND ASSOCIATED PRINTER

(71) Applicant: ILLINOIS TOOL WORKS INC., Glenview, IL (US)

(72) Inventors: Michael A. Whitby, Tipp City, OH (US); Randall L. Redman, Beavercreek, OH (US); Austin M. Knoblauch, Fairborn, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 17/536,590

(22) Filed: Nov. 29, 2021

(65) Prior Publication Data
US 2023/0166541 A1  Jun. 1, 2023

(51) Int. Cl.
*B41J 15/04* (2006.01)
*B41J 3/407* (2006.01)
*G01G 19/414* (2006.01)
*G01G 23/42* (2006.01)

(52) U.S. Cl.
CPC ........... *B41J 15/044* (2013.01); *B41J 3/4075* (2013.01); *G01G 19/4144* (2013.01); *G01G 23/42* (2013.01)

(58) Field of Classification Search
None
See application file for complete search history.

(56) References Cited

U.S. PATENT DOCUMENTS

| | | | |
|---|---|---|---|
| 5,645,360 A | 7/1997 | Iwane | |
| 5,882,126 A | 3/1999 | Bowling | |
| 6,604,874 B2 | 8/2003 | Carriere | |
| 8,162,553 B2 | 4/2012 | Vandermeulen | |
| 8,517,618 B2 | 8/2013 | Cartwright | |
| 2002/0162411 A1 | 11/2002 | Faucher | |
| 2003/0146966 A1* | 8/2003 | Fisher | B41J 3/4075 347/188 |
| 2011/0013962 A1 | 1/2011 | Montagutelli | |
| 2017/0066253 A1 | 3/2017 | Gady | |
| 2021/0291557 A1 | 9/2021 | Redman | |

FOREIGN PATENT DOCUMENTS

| | | | | |
|---|---|---|---|---|
| EP | 1564014 A2 | | 8/2005 | |
| EP | 3088316 A1 | * | 11/2016 | ............ B31D 1/021 |
| JP | H-0732661 A | | 2/1995 | |
| JP | 2000246987 A | * | 9/2000 | |
| KR | 101983838 B1 | * | 5/2019 | |
| KR | 101983838 B1 | | 5/2019 | |

* cited by examiner

*Primary Examiner* — Matthew G Marini
(74) *Attorney, Agent, or Firm* — THOMPSON HINE LLP

(57) ABSTRACT

An apparatus for holding label stock includes a body including a base and a roll holding area with a roll holding support extending from the base for receiving a roll of label stock. A plurality of rollers are located along a label stock feed path from the roll holding area to a label stock exit zone of the body. The plurality of rollers include a tensioning roller that is movable relative to the base to dissipate tension loads on label stock during label stock movement.

13 Claims, 8 Drawing Sheets

PRINTER CASSETTE WITH MOVABLE TENSIONING ROLLER AND ASSOCIATED PRINTER

TECHNICAL FIELD

This application relates generally to printing devices and, more particularly, to printing devices that utilize printer cassettes for holding label stock, such as printing devices in weighing scales.

BACKGROUND

Weighing scales are commonly used for weighing and pricing food items in groceries and supermarkets. The scales incorporate printing devices that function for printing pricing labels that can be applied to the food items. One known configuration is for the weighing scale to include an on-board print head alongside a label stock feed path, where the label stock feed path is defined, at least in part, by a removable cassette into which the label stock is loaded. In the case of linerless label stock, the label stock is not carried on any liner, and there is no take-up reel that helps pull the label stock through the print zone past the print head. As a result, inertial and drag loads on the label stock can result in compressed print on the label, particularly in systems in which the label stock is moved in reverse slightly, after a label stock cutting operation, for the purpose of moving the cut edge of the stock back toward the print line of the print head.

Accordingly, it would be advantageous to provide a cassette that includes a label stock tensioning arrangement that is both effective and enables a user to easily load label stock into the cassette along the proper feed path.

SUMMARY

In one aspect, a printing apparatus or cassette apparatus includes a body including a base and a roll holding area with a roll holding support extending from the base for receiving a roll of label stock. A plurality of rollers are located along a label stock feed path from the roll holding area to a label stock exit zone of the body. The plurality of rollers include a tensioning roller that is movable relative to the base to dissipate tension loads on label stock during label stock movement.

In another aspect, a cassette for holding label stock includes a cassette body including a base and a roll holding area with a roll holding support extending from the base for receiving a roll of label stock. The roll holding support defines a rotational axis for the roll of label stock, and the cassette body defines a cassette footprint as viewed in a direction along the rotational axis. A plurality of rollers are located along a label stock feed path from the roll holding area to a label stock exit zone of the cassette body, the plurality of rollers including a tensioning roller that is movable relative to the base between an operating position within the cassette footprint and a loading position external of the cassette footprint.

In a further aspect, a method of loading label stock into a cassette, involves: mounting a label stock roll into a roll holding area of a cassette body; moving a tensioning roller from an operating position within the cassette body to a loading position external of the cassette body; feeding label stock of the roll along a path between the cassette body and the tensioning roller while the tensioning roller is in the loading position; and moving the tensioning roller from the loading position back into the operating position such that a portion of the label stock is pulled into the cassette body.

The details of one or more embodiments are set forth in the accompanying drawings and the description below. Other features, objects, and advantages will be apparent from the description and drawings, and from the claims.

DETAILED DESCRIPTION

Figure 1:
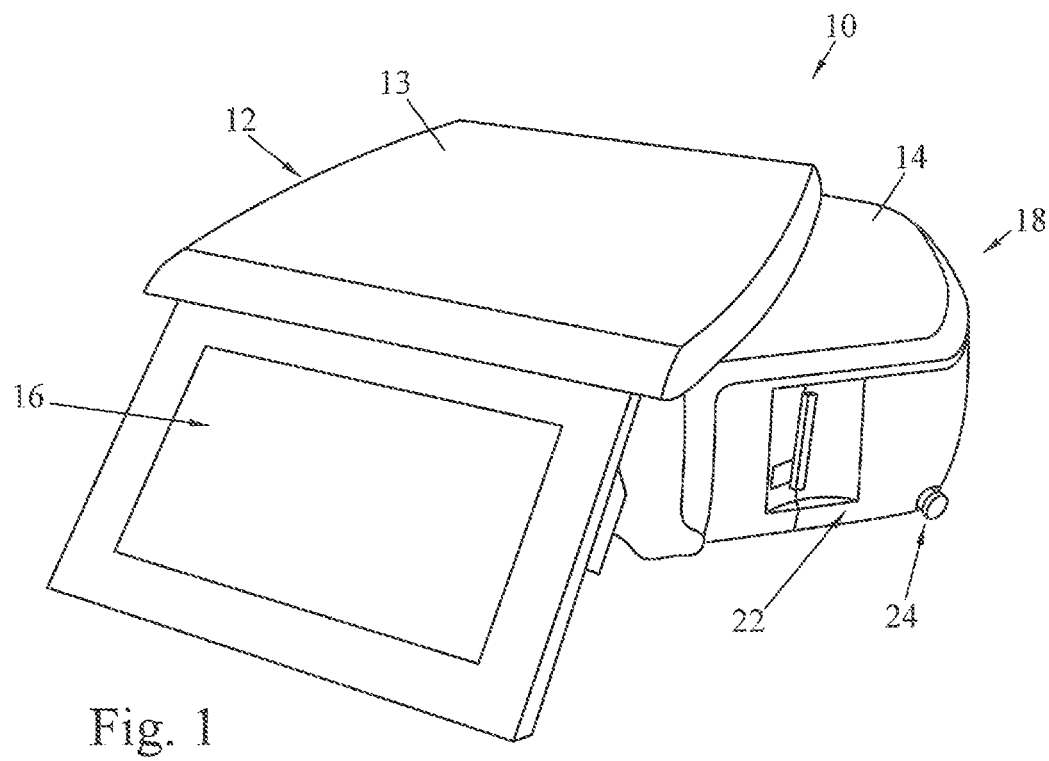
FIG. 1 is a perspective view of a weighing scale incorporating a printing device and label stock cassette.
Figure 2:
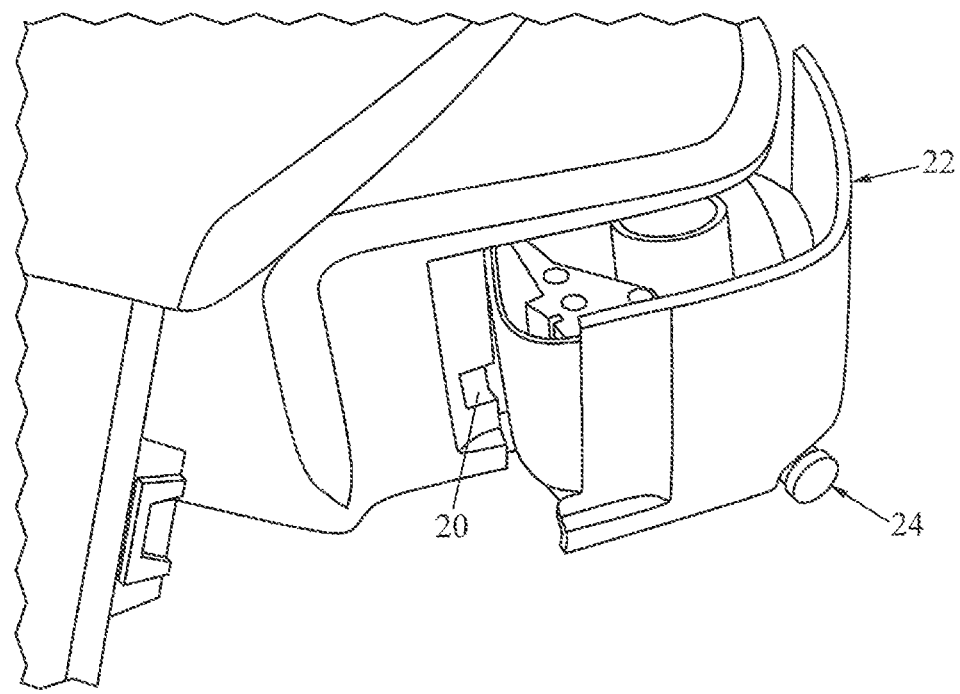
FIG. 2 is a partial perspective of the weighing scale as the cassette is being removed.

Referring to FIGS. 1-2, a weighing apparatus 10 in the form of a food product scale includes a weighing station 12, which in some embodiments may be formed by a weighing platter 13 that can be removed (e.g., for cleaning) from atop the scale housing 14, and having an associated mechanism, such as a load cell located internal of the scale housing 14, for producing weight indicative signals when items are placed on the weighing station. An operator interface side of the scale includes an operator interface 16 configured to display information associated with scale operations. By way of example, the operator interface 16 may be formed by a touch-screen display. A customer interface side of the scale may include a customer interface, which in certain embodiments may be formed by any suitable display screen technology. A side portion 18 of the scale housing includes a label exit slot 20 and incorporates a label printer therein. A label cassette 22 is removably mounted in a side slot of the housing 14, with an eject button 24 provided to enable removal, per FIG. 2.

Referring to FIGS. 3-12, an exemplary label stock cassette 30 is shown and includes a cassette body 32 including a base 33 and a side wall 34. The base defines a roll holding area 36 with a roll holding support 38 extending from the base for receiving a roll of label stock, such as linerless label stock. Loaded label stock rotates about an axis 39 of the support 38 during printing operations that feed out the label stock. A plurality of rollers 40, 42, 44, 46, 48, 50 and 52 are located along a label stock feed path depicted per label stock 54 from the roll holding area 36 to a label stock exit zone 56 of the cassette body. Here, rollers 40, 42, 44, 48 and 50 are idler rollers that are not driven, but which can rotate as a result of interaction with the moving label stock. Roller 46 is a tensioning roller that is movable relative to the base and is also an idler type roller. Here, rollers 40, 42, 44, 46, 48 and 50 all include a set of rubber O-rings (e.g., 40a, 42a, 44a, 46a, 48a and 50a) that contact the label stock during label stock movement. Roller 52 is a driven print roller that drives label stock movement and also operates to press the label stock against a print head during printing operations.

Figure 3:
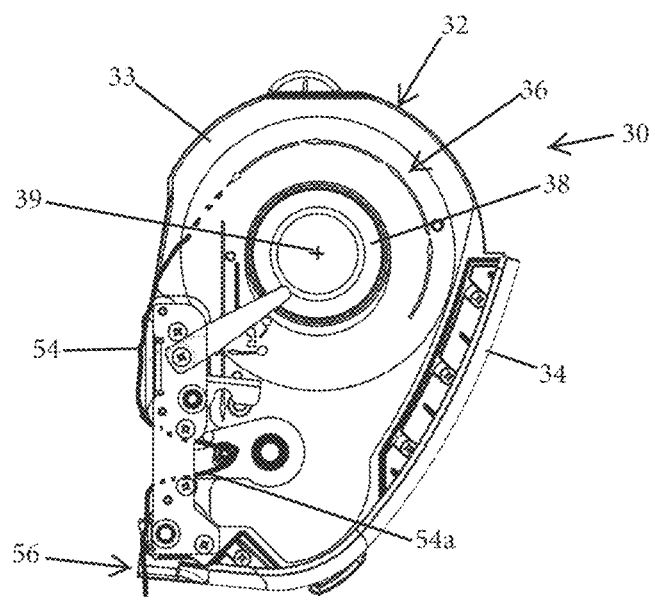
FIG. 3 is a plan view of an exemplary label stock cassette.
Figure 4:
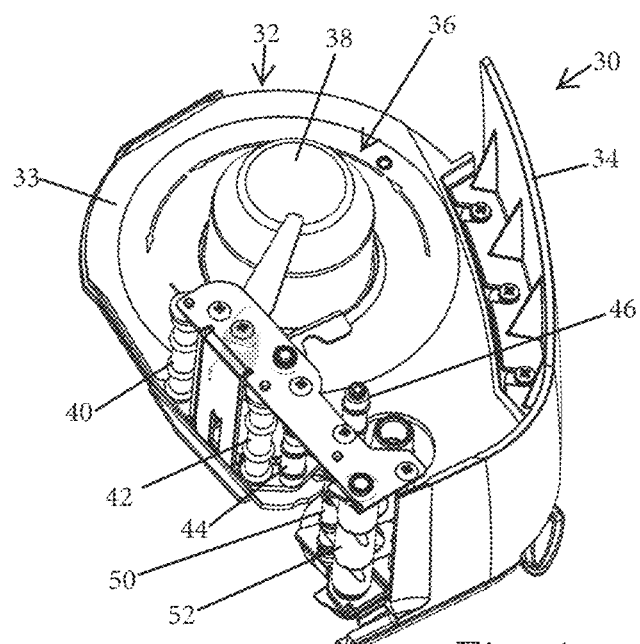
FIGS. 4 and 5 are perspective views of the cassette.
Figure 5:
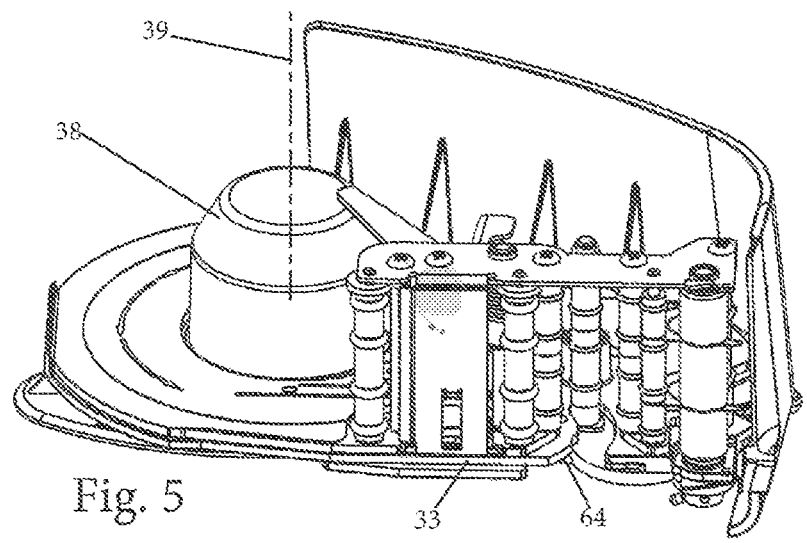
Figure 6:
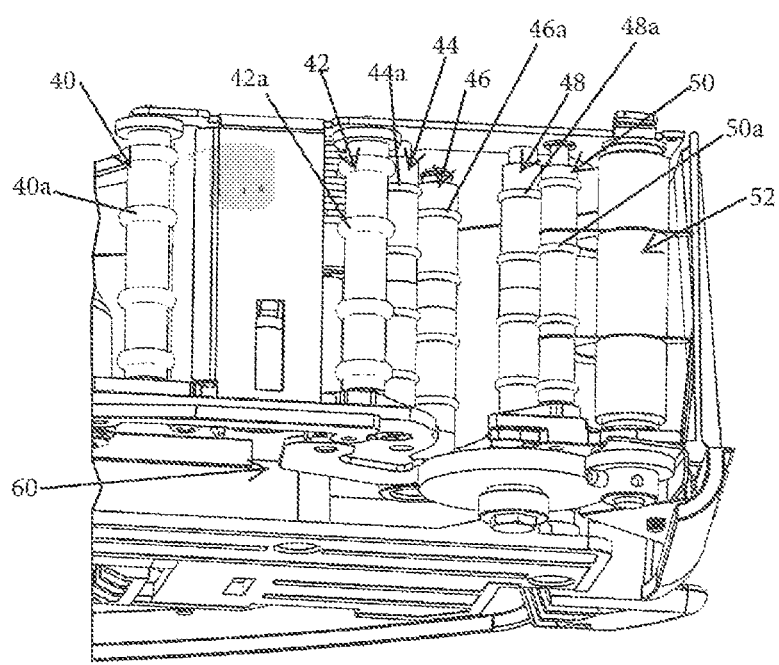
FIGS. 6 and 7 are partial perspectives from a side of the cassette.
Figure 7:
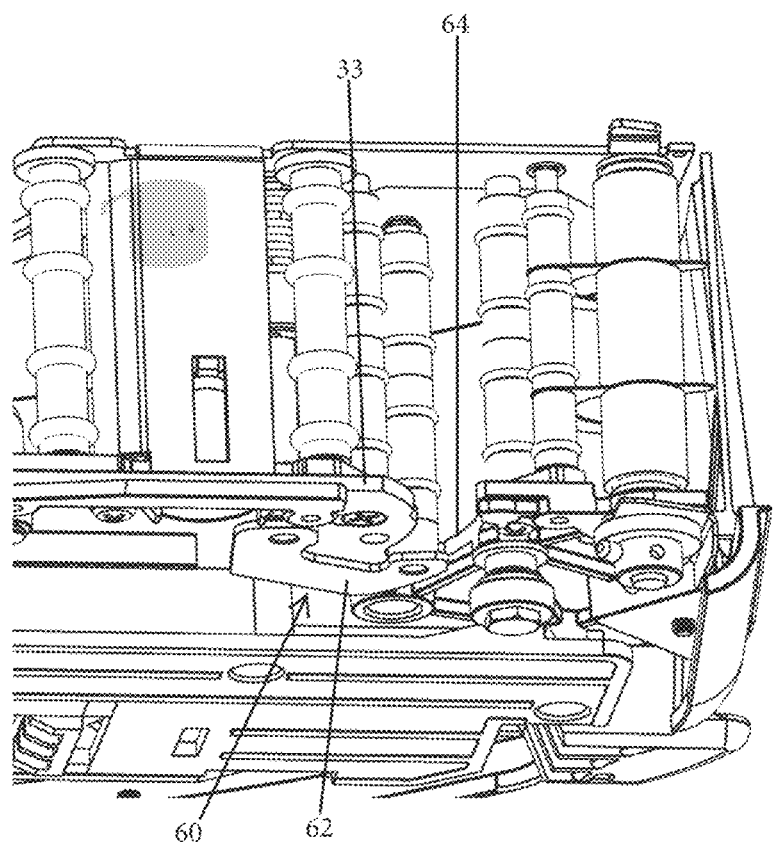
Figure 8:
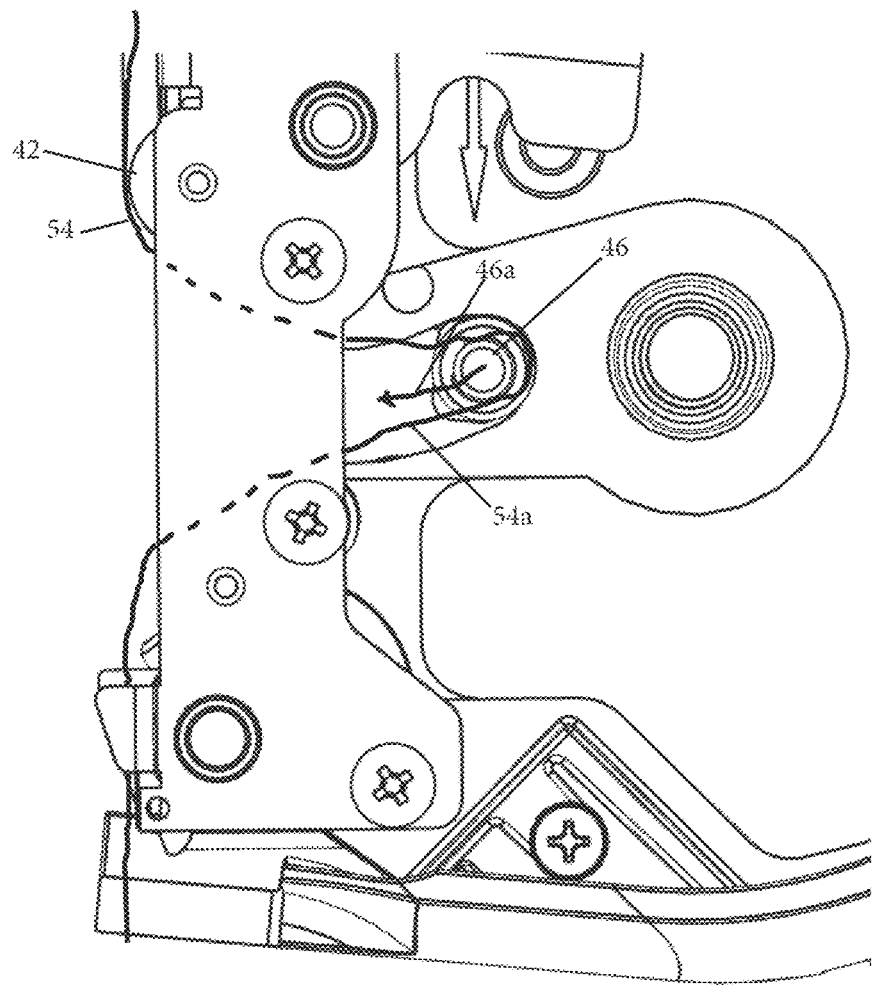
FIG. 8 is a partial plan view of the cassette.
Figure 9:
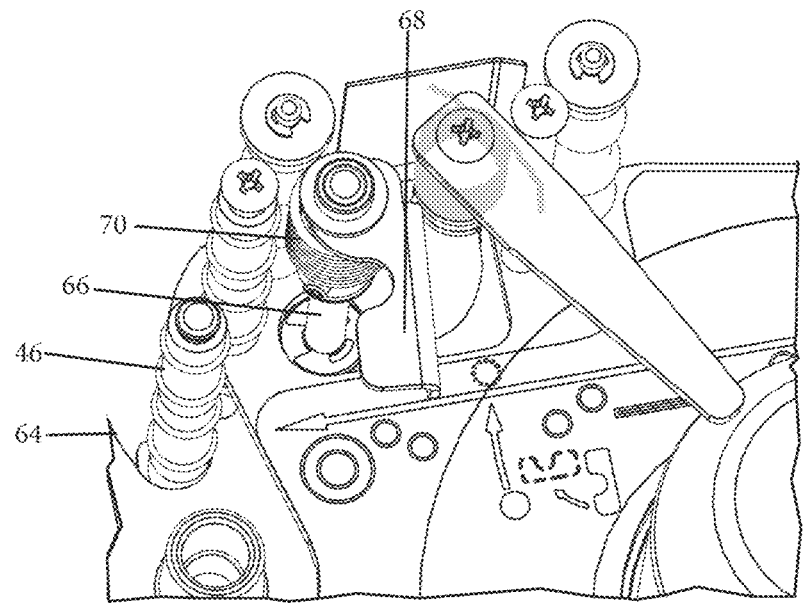
FIGS. 9 and 10 are partial perspectives of the cassette, with certain components omitted, showing the pivot post and torsion spring arrangement.
Figure 10:
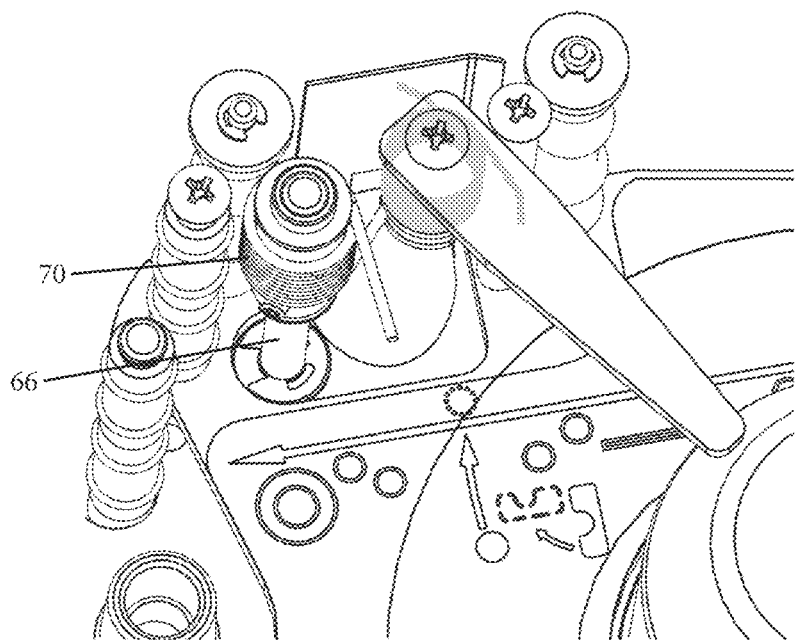
Figure 11:
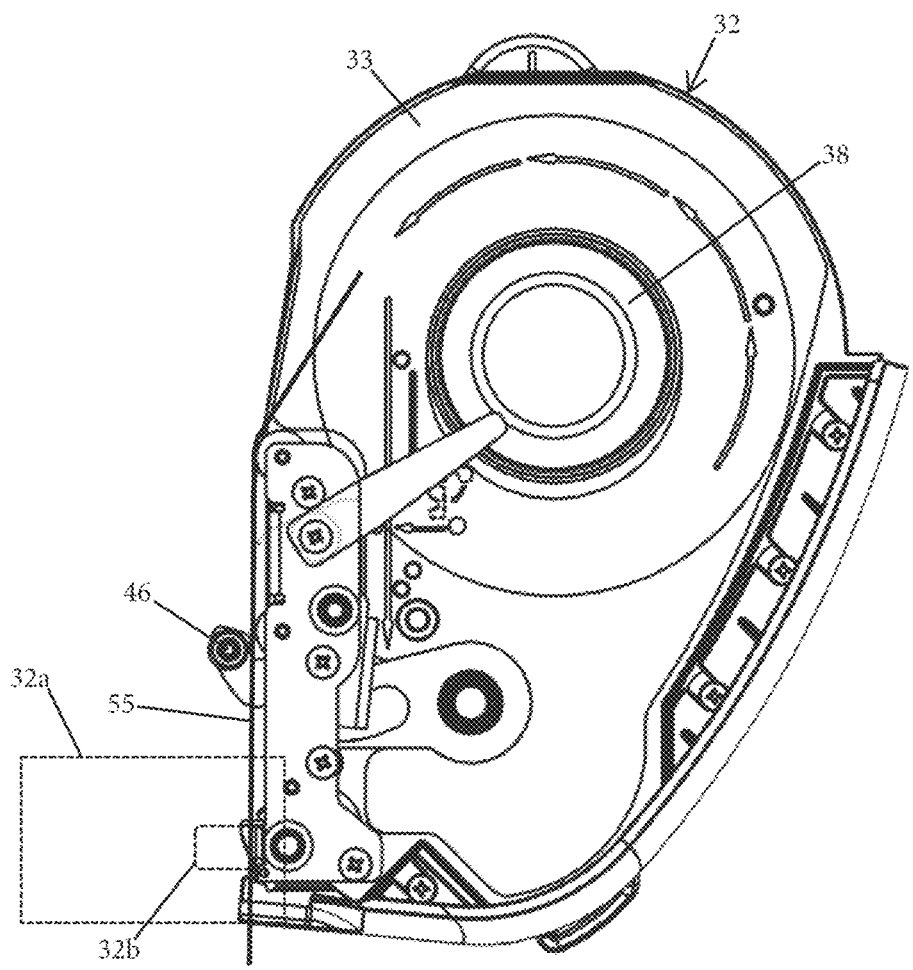
FIG. 11 is a plan view of the cassette with the tensioning roller in a label stock loading position.
Figure 12:
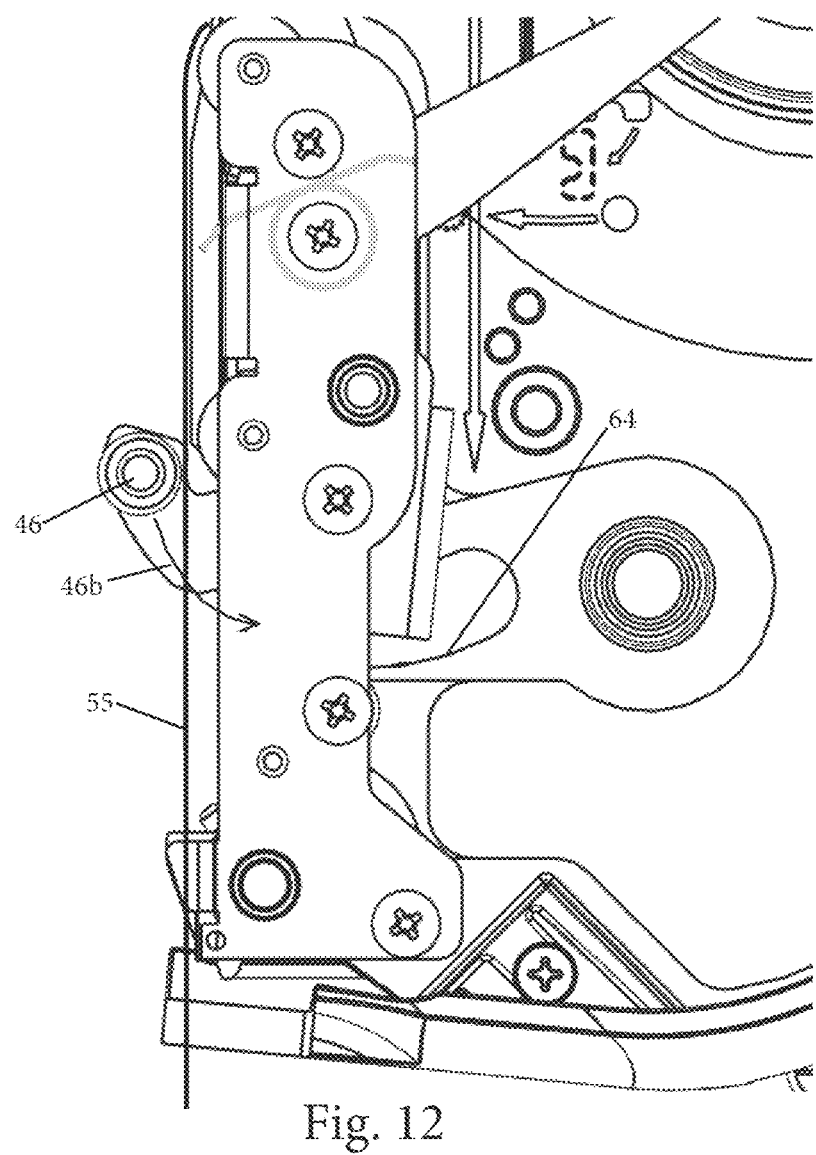
FIG. 12 is an enlarged view of part of FIG. 11.

The label stock feed path includes looped label stock section 54*a* that extends around the tensioning roller 46, and the tensioning roller is biased into the operating position shown in FIGS. 3 and 8. However, under label stock tension forces, the tensioning roller 46 is movable, per arrow 46*a*. In particular, when the scale starts to print a label and the label stock advances, the label stock quickly changes from a state of being loose to being in tension. To prevent the label stock at the print line from slowing down due to drag (inertial and/or friction loads), the loop 54*a* of label stock around the tensioning roller 46 tightens and tries to straighten out to match the load path. Depending on the amount of drag for a given roll of label stock, the label stock applies a force to the tensioning roller and moves the tensioning roller towards the load path in direction 46*a*. The load from the label stock is counterbalanced by the bias force applied to urge the tensioning roller into the position of FIGS. 3 and 8, and the tensioning roller 46 moves until equilibrium is achieved between the tension of the label stock and the bias force. As the label stock continues to move during the label printing process, these dynamic forces of label stock tension and bias force cause the tensioning roller 46 to continually move to maintain the equilibrium. This process effectively spreads and dissipates the tensioning load throughout the printing process and thereby prevents the undesirable compressed print issue that occurs without the tensioning roller mechanism.

Notably, in addition to movement of the tensioning roller 46 within the cassette body footprint during printing, the tensioning roller 46 is also movable between the operating position (FIGS. 3 and 8) and a loading position (FIGS. 11 and 12) to facilitate initial feed of label stock along the label stock feed path. Notably, in the loading position, the tensioning roller 46 is moved outward past the side portion of the cassette body to a position outside the footprint of the cassette body. This loading position enables simple routing of the label stock during change-out of a spent label stock roll for a new label stock roll. In particular, the tensioning roller 46 is moved from the operating position to the loading position and held in the loading position. The label stock can then be routed along a straight line path 55 between the tensioning roller 46 and the cassette body. Upon release of the tensioning roller, the bias automatically moves the tensioning roller back to the operating position, per arrow 46*b*, and the tensioning roller 46 contacts the label stock and pushes a loop of label stock into the cassette body.

In the illustrated embodiment, the tensioning roller 46 is mounted on a pivot assembly 60 that pivots to move the tensioning roller between the operating position and the loading position. Here, the pivot assembly includes a pivot bar 62 to which the tensioning roller is rotatably mounted. The pivot bar 62 is pivotably mounted at an underside of the base 33, and a slot 64 extends inward from a feed path side of the base 33, with the tensioning roller 64 extending upward through the slot 64 when the tensioning roller is in the operating position. The pivot bar 62 is connected to the bottom of a rotatable pivot post 66 that includes a lever arm 68 that extends therefrom for manually pivoting the pivot post and the pivot bar from the operating position to the loading position. A torsion spring 70 is associated with the pivot post 66 to bias the pivot post into a position corresponding to the operating position of the tensioning roller 46, and thus the torsion spring provides the aforementioned bias.

The above-described cassette configuration provides a cassette that is adapted to limit compressed printing problems and that also facilitates simple loading of label stock along the label stock feed path.

It is to be clearly understood that the above description is intended by way of illustration and example only, is not intended to be taken by way of limitation, and that other changes and modifications are possible. For example, while tensioning roller that pivots to dissipate label stock tension forces is primarily shown, other embodiments are possible, such as a linear sliding movement of the tensioning roller. Moreover, the system could be incorporated directly into a printing apparatus that does not require a cassette (e.g., per FIG. 11, where an additional body section 32*a* is shown in dashed line form and is integrated with body 32 and includes the print head 32*b*).

The invention claimed is:

1. A printing apparatus, comprising:
    a body including a base and a roll holding area with a roll holding support extending from the base for receiving a roll of label stock;
    a plurality of rollers located along a label stock feed path from the roll holding area to a label stock exit zone of the body, the plurality of rollers including a tensioning roller that is movable relative to the base to dissipate tension loads on label stock during label stock movement;
    wherein the tensioning roller is movable between an operating position and a label stock loading position, wherein, in the operating position, the label stock feed path extends from the roll holding area and loops around the tensioning roller;
    wherein the tensioning roller is mounted on and extends from a pivot bar,
    wherein the pivot bar is mounted at an underside of the base, wherein a slot extends inward from a feed path side of the base, wherein the tensioning roller extends upward through the slot when the tensioning roller is in an operating position,
    wherein the pivot bar is connected to a pivot post that includes a lever arm extending therefrom for manually pivoting the pivot post and the pivot bar.

2. The printing apparatus of claim 1, wherein a torsion spring is associated with the pivot post to bias the pivot post into a position corresponding to the operating position of the tensioning roller.

3. A weighing scale, incorporating the printing apparatus of claim 1, wherein the body is a cassette body, the weighing scale including:
    a housing;
    a weighing platter for receiving items to be weighed;
    a user interface including a display screen;
    wherein the cassette body is removably mounted in the housing.

4. The printing apparatus of claim 1, wherein the tensioning roller is biased into a set position and tension on label stock during printing works against the bias and causes the tensioning roller to move relative to the base counter to the bias.

5. A printing apparatus, comprising:
    a body including a base and a roll holding area with a roll holding support extending from the base for receiving a roll of label stock;
    a plurality of rollers located along a label stock feed path from the roll holding area to a label stock exit zone of the body, the plurality of rollers including a tensioning roller that is movable relative to the base to dissipate tension loads on label stock during label stock movement;

wherein the tensioning roller is mounted on a pivot assembly for movement between an operating position and a label stock loading position, wherein the pivot assembly includes a pivot bar and a lever arm for manually pivoting the pivot bar:

wherein a slot extends inward from a feed path side of the base and the slot is open at the feed path side of the base, wherein the tensioning roller is positioned along the slot when the tensioning roller is in the operating position, and the tensioning roller is located externally of the slot when the tensioning roller is in the label stock loading position.

6. The printing apparatus of claim 5, wherein the pivot bar is connected to a pivot post, and the lever arm extends from the pivot post.

7. A printing apparatus, comprising:
a housing;
a body including a base and a roll holding area with a roll holding support extending from the base for receiving a roll of label stock;
a plurality of rollers located along a label stock feed path from the roll holding area to a label stock exit zone of the body, the plurality of rollers including a tensioning roller that is movable relative to the base to dissipate tension loads on label stock during label stock movement;
wherein the body is a cassette body removably mounted into the housing, and the tensioning roller is mounted to the cassette body such that the tensioning roller is removed from the housing when the cassette body is removed from the housing.

8. The printing apparatus of claim 7, wherein the label stock loading position is located to facilitate initial feed of label stock along the label stock feed path.

9. The printing apparatus of claim 8, wherein the tensioning roller is biased into the operating position.

10. The printing apparatus of clam 9, wherein a torsion spring is arranged to bias the tensioning roller into the operating position.

11. The printing apparatus of claim 8, further comprising:
wherein the operating position is within a footprint of the cassette body, wherein the label stock loading position is outside the footprint of the cassette body.

12. The printing apparatus of claim 8, wherein, when the tensioning roller is in the operating position, the label stock feed path extends from the roll holding area, along a side portion of the body, loops inward around the tensioning roller and then extends along the side portion to the exit zone.

13. The printing apparatus of claim 12, wherein, when the tensioning roller is in the label stock loading position, the tensioning roller moves outward past the side portion of the body.

* * * * *